United States Patent Office 3,708,264
Patented Jan. 2, 1973

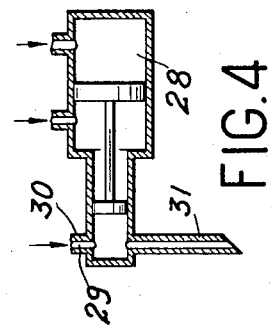
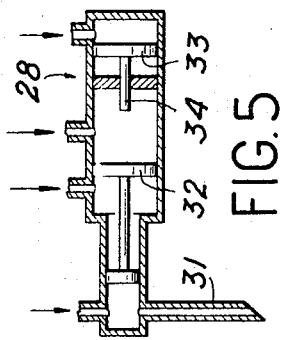
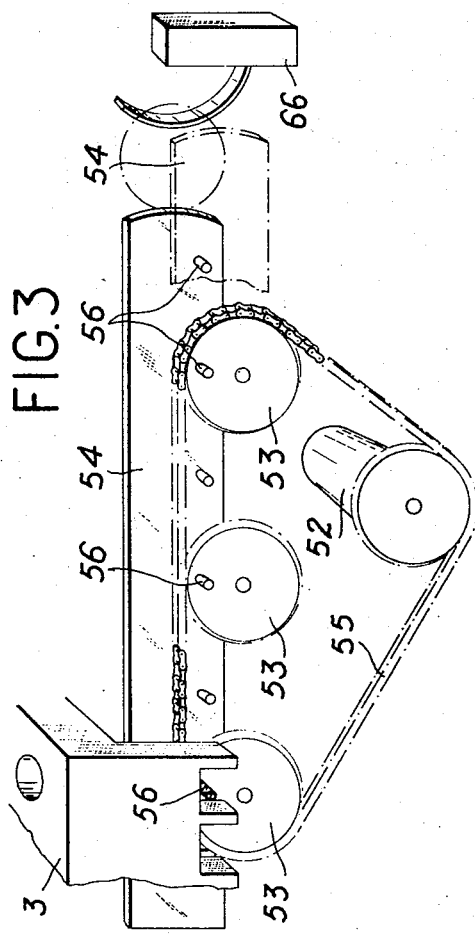
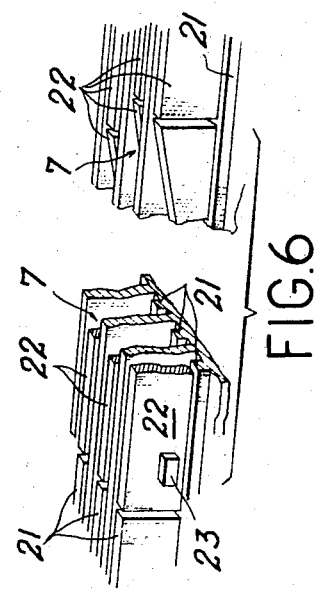

3,708,264
AUTOMATIC SAMPLE ANALYZER
Christian Francis Jottier, Herfelingen, Belgium, assignor to l'Automation Chimique et Nucleaire, Brussels, Belgium, and Commissariat a l'Energie Atomique, Paris, France
Filed Aug. 11, 1971, Ser. No. 170,871
Claims priority, application Belgium, Aug. 14, 1970, 92,877
Int. Cl. G01n 1/14
U.S. Cl. 23—230 R    16 Claims

ABSTRACT OF THE DISCLOSURE

The analyzer comprises at least $n+1$ parallel paths to be selected and corresponding to the maximum number of analyses to be performed on a sample for which one path is reserved, a series of test-tubes including a sample test-tube and a number $\leq n$ of analytical test-tubes being displaced simultaneously along said paths and placed vertically on a support in transverse rows. Means controlled by a pre-established program are provided at the point of injection of reagents into the analytical test-tubes for detecting the presence of one test-tube on each path in order to permit injection of reagents into the test-tubes which are present and to prevent such injections opposite to paths on which no analytical test-tubes are present.

BACKGROUND OF THE DISCLOSURE

Figure 1:
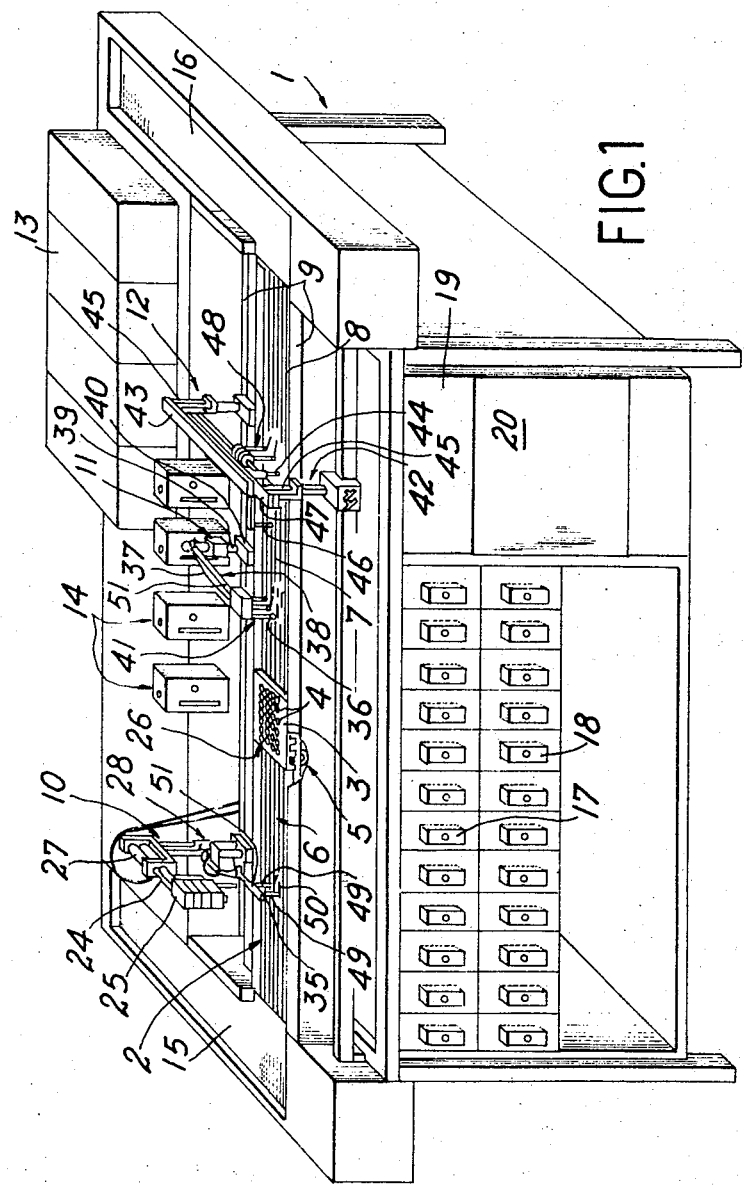

This invention relates to an automatic analyzer for sequential analyses of a plurality of samples located in test tubes. Such analyzers already exist which comprise means for moving successive series of test tubes along parallel paths, one test-tube of each series being intended to contain a sample to be analyzed and the other test-tubes being intended to receive a predetermined dose of said sample as well as different reagents corresponding to the analyses to be performed, means for taking sample doses from the sample test-tube and transferring said doses into each of the other test-tubes, means for injecting a predetermined dose of a reagent into each of the other test-tubes aforesaid as well as means for taking a dose of the contents of each test-tube in order to detect the result of each analysis and if necessary to identify and print the result of said analyses.

The most automatic analyzers in present use are designed to perform a predetermined number of analyses on a sample and they carry out the same number of analyses in respect of each sample. However, when some analyses are not necessary as is frequently the case, this results in complete wastage of reagents which are often very costly. Another drawback of present days' systems consists in that the detection of the result of analyses performed on one sample cannot be effected simultaneously by reason of the differences in reaction times, thereby resulting in the use of costly memory or stores in the case of data processing systems. In analyzers of existing types, consideration is not usually given to contamination of devices through which the samples to be analyzed are passed and this impairs the results of analysis, entails the need for interpretation of the results and calls in some instances for a further analysis insofar as this remains possible. Analyzers at present in existence suffer from a further drawback in that, on the one hand, they cannot be readily converted to perform types of analyses other than those for which they were designed and, on the other hand, they do not permit specific incubation.

The object of the invention is to overcome the disadvantages referred-to above and to provide an automatic analyzer which is adapted to permit the possibility of varying the number of analyses in the case of each sample, a further advantage offered by the analyzer being the fact that it permits simultaneous detection of all the analyses corresponding to one sample, reduces contamination hazards to a considerable extent and permits specific incubation of the analytical test-tubes.

To this end and in accordance with the invention, the automatic analyzer comprises at least $n+1$ parallel paths to be selected and corresponding to the maximum number of analyses to be performed by means of the analyzer on a sample for which one path is reserved, a series of test-tubes including the sample test-tube and a number $\leq n$ of analytical test-tubes being displaced simultaneously along said paths and placed vertically on a support in transverse rows with respect to the direction of displacement, means being provided at the point of injection of reagents into the analytical test-tubes for detecting the presence of one test-tube on each of the paths followed by said test-tubes, said means being intended to permit injection of reagents into the test-tubes which are present according to a predetermined program and to prevent said injections opposite to paths on which no analytical test-tubes are present.

In one embodiment of the invention, provision is made at the point at which sample doses of the sample test-tube are taken from the analytical test-tubes for means which serve to detect the presence of one test-tube on each of the paths followed by said analytical test-tubes in order that the transfer of sample doses should be permitted only in those analytical test-tubes which are present on the paths aforesaid and on the basis of a pre-established program.

Figure 2:
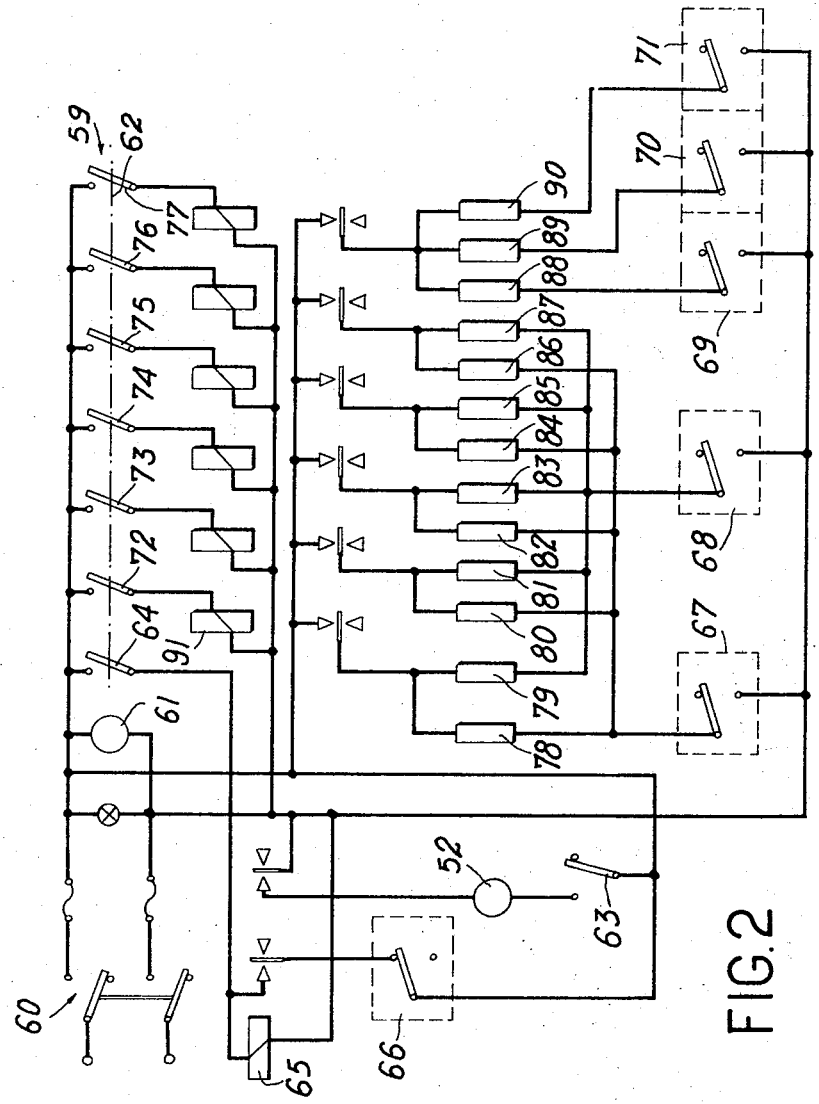

A better understanding of the invention will be gained from the following description of the accompanying drawings in which one particular embodiment of the object of the invention is illustrated by way of non-limitative example, and in which:

FIG. 1 is a diagrammatic view in perspective showing an automatic analyzer according to the invention;
FIG. 2 is a schematic diagram of the electrical installation of the analyzer;
FIG. 3 is a diagrammatic view in perspective showing the system for displacing the test-tube supports;
FIGS. 4 and 5 are detail views in part-sectional elevation showing two heads for taking sample doses;
FIG. 6 is a partial diagrammatic view in perspective showing a detail of the incubation zone of the analyzer.

The automatic analyzer in accordance with the invention as shown in the drawings is essentially made up of a frame 1 which supports a conveying table 2 for the supports 3 of test-tubes 4; said table 2 comprises a system 5 for displacing the test-tube supports, parallel traversing or conveying lines 6 for the test-tubes 4 and incubation channels 7 for these latter, a waste channel 8 as well as rails 9 which are parallel to the conveying lines 6, said rails being intended to support and to secure one or a number of units 10 each designed for taking a sample, for dosing this latter and distributing the sample in analytical test-tubes, one or a number of units 11 for injection of reagents, one or a number of units which are not shown in the drawings and intended for analyses or preparations such as dialysis, defecation and the like, a transfer unit 12 which directs the contents of the analytical test-tubes to measuring instruments 13 such as colorimeters. The table 2 which also supports thermostats 14 for regulating the temperature of the liquid contained in the incubation channels 7 is provided at the ends of the conveying lines 6 with a charging table 15 for bringing the supports 3 loaded with test-tubes 4 onto said conveying lines and a discharging table 16 which permits withdrawal of the supports 3 and the test-tubes at the end of the analytical system. The frame 1 of the analyzer also supports the reagent proportioning pumps 17 and reagent storage means, the transfer proportioning pumps 18, a control panel 19 and a device 20 which makes it possible by calibration to convert the percentages of transmission of light detected by the colorimeters into concentration of the element to be determined, a further object of the device being to permit identification of the sample and printing of the results of analyses.

The design arrangements which are provided in the analyzer for establishing and modifying the analytical system comprise the sampling units 10, the injection units 11, the dialysis units and a transfer unit 12. Said units which will be described separately hereinafter are capable of sliding on the rails 9 in a direction parallel to the analysis lines and of being secured in position with respect to said rails by means of pressure screws in order to select the positions of a number of units with respect to the other units according to the types of analysis to be performed whilst the test-tube supports are displaced in step-by-step motion at constant speed. These arrangements also comprise in the case of each analysis line stationary rails 21 and movable rails 22 for supporting and guiding the test-tubes, the movable rails 22 being intended either to adjust the incubation zone or to eliminate this latter and to transfer said test-tubes from a non-incubated level outside the incubation channels 7 to an incubated level inside said channels whose temperature can be adjusted separately, and conversely. The stationary rails 21 are horizontal and are provided at the ends of the conveying table 2 at the nonincubated level and at the bottom of the channels 7 at the incubated level. The movable rails 22 are of unit-construction and are either horizontal or inclined to permit transfer of test-tubes from one level to the other, said rails 22 being inserted into the channels 7 and maintained within these latter by means of magnets 23.

The arrangements provided in the analyzer for transmitting the data supplied by the analysis lines to the program in order to permit either the performance or the elimination of each function carried out by the sampling units, injection units and the like are constituted by feelers which will be described hereinafter. Said feelers serve to detect the presence or absence of analytical test-tubes at the points of sampling and injection and to transmit electrical data to the program. These arrangements avoid any unnecessary analyses and readings of results of analyses in the analytical system, thus automatically achieving a particularly substantial economy of very costly reagents without appreciably increasing the complexity and capital cost of the analyzer.

The sampling unit or units 10 comprise a movable arm 24 which carries a sampling head 25. The arm 24 is so arranged as to be capable of displacement on the one hand along a longitudinal axis which is parallel to the rows 26 of test-tubes under the action of a double jack 27 and on the other hand in a direction at right angles to said axis under the action of a double jack 28. When taking sample doses without reagent, only one unit 10 is employed. In the event that some sampling operations or all sampling operations are carried out with reagent, a number of units 10 are disposed successively within the analytical system in order to take reaction times into account, this successive arrangement of the units 10 being made necessary by the fact that the operations for reading the results of analyses are performed simultaneously. The sampling head 25 is a microproportioning pump. In order to prevent contamination and when designed for taking samples without reagent, said pump 28 has an inlet 29 to which is connected a pipe 30 for the supply of fluid under pressure which serves to clean the pump and is also provided with a sampling needle 31, the fluid being injected between the taking of two different samples. Again in order to prevent contamination and when employed for taking samples with reagent, the pump 28 is associated with a reagent proportioning pump 17 which feeds into the pump 28 at the time of delivery of the sample which has been drawn up by this latter a dose of reagent which fills the available space within the pump 28 and the sampling needle 31; said pump 28 has two pistons 32 and 33 and said piston 33 has a member 34 which is intended to limit the travel of the piston 32 momentarily. The fluid under pressure which actuates the pump 28 is distributed within the pump by means of three passageways, the order of introduction of the fluid into each passageway being chosen so as to produce partial suction of the reagent contained within the pump prior to taking a fresh sample to be analyzed, thereby causing aspiration of an air bubble into the sampling needle 31, said bubble being intended to form a plug between the reagent and the fresh sample to be taken. The unit or units 10 are fitted with feelers 35 which are equal in number to the analysis lines of the analyzer and intended to detect at the level of the units 10 the test-tubes which are present on each of said analysis lines.

The units 11 for the injection of reagent which correspond in number to the reagents to be injected into the analytical test-tubes each comprise an injection head constituted by a needle 36 which is connected to a pump 17 by means of a pipe 37. Said needles 36 are located directly above the analysis lines and are positionally adjustable in order that it may thus be possible either to align the axes of said needles with the axes of the test-tubes or to adjust the angle of incidence of the jet of reagent with respect to the test-tube axis. Each injection head is mounted by means of a stationary arm 38 on a column 39 which is capable of sliding along one of the rails 9; the shoe 90 of said column can be secured in position with respect to the rail 9 by means of pressure screws which are applied against this latter. The units 11 are each fitted with a feeler 41 which is arranged so as to detect at the level of the units 11 the test-tube which is present on the corresponding analysis line. Provision is made for a single sampling unit 12 by reason of the fact that sampling operations for reading the results are performed simultaneously within the analyzer aforesaid. Said unit 12 is constituted by a gantry 42, the transverse portion 43 of which is parallel to the rows 26 of test-tubes and carries the sampling needles 44. Said gantry 42 is capable of moving in a direction at right angles to the analysis lines in order that the sampling needles 44 may be permitted to carry out the sampling operation, said portion 43 being driven by means of two jacks 45 forming part of the gantry uprights which are guided on the rails 9 and clamped in a selected position against said rails by means of pressure screws. The portion 43 of the gantry also carries vibrating stirrers 46 such as vibrating rods which are intended to be introduced into a row of analytical test tubes before sampling is carried out within the test-tubes of this row and while sampling is being performed within the analytical test-tubes of a previous row. The gantry 42 also has an identification system which is known per se and is therefore not shown in the drawings. Said system is intended to cooperate with each sample test-tube which passes through the analyzer on the one hand in order to identify the analyses which are in progress and on the other hand in order to transmit the identification data to the above-mentioned device 20. The gantry 42 also has a stationary cross-piece 47 for carrying feelers 48 which are intended to detect the presence of analytical test-tubes on each analysis line at the level of said gantry 42.

The feelers 35, 41 and 48 are designed not only to detect the analytical test-tubes but also to guide and maintain these latter at the sampling and injection points in order that the longitudinal axes thereof should coincide substantially with the axes of the sampling and injection needles. Each feeler is constituted by two parallel rods 49 placed on each side of the analysis lines at a distance which is greater than the diameter of the test-tubes. Each rod 49 has a flexible element 50 which is placed across the aforesaid lines. Said flexible elements 50 which permit operation of the feeler are placed at a distance from the paths followed by the test-tubes such as to permit the use of test-tubes having different heights, the flexibility of the elements 50 being sufficient to ensure that said test-tubes are permitted to pass without encountering any resistance when the test-tube support is being displaced. The feelers 35 and 41 each produce action on a micro-switch which transmits information to the programmer by means of a lever 51 whilst the feelers 48 produce action directly on the micro-switches.

The test-tube support 3 is guided on the conveying table 2 in such a manner as to ensure that the rows of test-tubes are displaced in parallel relation, said support being driven in step-by-step motion by means of a motor 52. The step which is intended for the displacement of the support as well as the different positions which can be occupied by the units 10, 11, 12 and if necessary by the dialysis units, defecation units and the like are so determined that, when the feelers 35, 41 and 48 which permit the performance of the pre-established program of the analyzer have closed the micro-switch or micro-switches controlled by said feelers under the action of the analytical test-tubes which are present on the support, said support comes to a standstill. Said support 3 is driven by the motor 52 by means of eccentric discs 53 which are joined together by a link-arm 54 and driven by a chain 55. The discs and the link-arm are provided with studs 56 which cooperate with a recessed portion 57 of the support 3. The studs 56 are in aligned and uniformly spaced relation so that one stud should always engage in one of the recesses 57 of the support 3 in order to cause this latter to advance by one step. The support 3 is constituted by a perforated plate through which the test-tubes are capable of sliding freely in order to pass from one of the two above-mentioned levels to the other. Said test-tubes are each provided with a flange in order to prevent them from dropping through the plate, a series of perforations being reserved in said plate in order that the corresponding needles should have access to the aforesaid waste channel. The conveying table 2 comprises an additional path which is not shown and is parallel to the paths mentioned in the foregoing in order to cooperate with the dialysis, defecation and other units for the preparation of samples.

The automatic analyzer in accordance with the invention comprises a cam-type programmer 59 in which provision is made for an extremely small number of cams compared with the number of functions of the analyzer. When the two-pole switch 60 is in the closed-circuit position, the motor 61 is supplied and drives the cam-shaft 62 of the programmer; when the single-pole switch 63 is in the closed-circuit position and the cam-shaft 62 is driven in rotation and when the control arm of the micro-switch 64 falls into the recess of cam No. 1, the motor 52 is supplied with current and rotates. The micro-switch 64 is then in the closed-circuit position and the relay 65 is energized, the changeover contacts of the relay 65 are reversed and thus have the effect on the one hand of ensuring the supply of current to the motor 52 and on the other hand of maintaining the relay 65 energized by means of one of its own changeover contacts and by means of the micro-switch 66 which is in closed circuit in the rest position and which is actuated by the above-mentioned link-arm 54. Said link-arm is set in motion as a result of rotation of the motor 52 and, in order to drive the supports 3 in step-by-step motion, will accordingly produce action on the micro-switch 66 at the end of each step. At this moment, the micro-switch 64 is already in the open-circuit position since the recess of cam No. 1 which is continuously driven by the motor 61 has already stopped producing action on the arm of said micro-switch 64. When the link-arm 54 actuates the micro-switch 66, the circuit which energizes the relay 65 is put on open circuit; the relay 65 is de-energized and the circuit for supplying the motor 52 is broken; said motor stops, thereby returning the micro-switch 66 to the closed-circuit position since the motor 52 which has a certain inertia continues to drive the link-arm 54 which is thus caused to overstep its dead point and release the micro-switch 66.

The diagram shown in FIG. 2 relates to an analyzer having two analysis lines, in which the micro-switches 67, 68, 69, 70 and 71 correspond respectively to the detection of a test-tube opposite to the sampling head in line No. 1, to the detection of a test-tube opposite to the sampling head in line No. 2, to the detection in lines No. 1 and No. 2 of test-tubes at the level of injection of a reagent, to the detection of a test-tube in line No. 2 at the level of injection of a second reagent. The micro-switches 64 and 72 of the programmer which are controlled by the cams aforesaid correspond respectively to the control of the motor 52, to the control of the upward-motion and downward-motion functions of the heads for taking sample doses, control of the forward-motion and backward-motion functions of the sampling heads, control of the suction-discharge functions of the micro-dosers, control of the micro-doser limitation function, control of the discharge-suction functions of the micro-dosers for the reagent No. 1 in the different analysis lines, control of the discharge-suction functions of the micro-dosers for the reagents Nos. 2, 3 . . . in the different analysis lines. The electrovalves 78 to 90 correspond respectively to the control of upward motion and downward motion of the sampling heads of the two analysis lines, control of forward motion and backward motion of the heads, control of suction and discharge of the micro-doser which constitutes each sampling head, control of limitation of said micro-dosers, control of discharge and suction of the reagent No. 1 in the two analysis lines, control of discharge and suction of the reagent No. 2 in the two analysis lines, and so forth. The cams of the programmer are so adjusted that the contacts of the micro-switches 72 to 77 are open while the motor 52 is supplied with current.

The micro-switch 67 which corresponds to the operation of the sampling head acts on the analysis line No. 1 and isolates all the sampling functions in said line No. 1, namely upward and downward motion of the head, forward and backward motion of the head, suction and discharge of the micro-doser, limitation of this latter and discharge and suction of the reagent No. 1. The micro-switch 68 carries out the same functions in the analysis line No. 2.

If the feeler 35 detects a test-tube at the sample-taking level and actuates the micro-switch 68, the switch is put in the closed-circuit position and connects one phase to the electrovalves 78, 80, 82, 84 and 86. This partial supply will be maintained as long as the motor 52 is not supplied, that is to say during the time taken by the motor 61 to cause rotation of the cams of the programmer through one complete revolution. The micro-switches 64 and 72 to 77 will be put one after the other into the closed-circuit position and if consideration is given by way of example to the case of the micro-switch 72 which corresponds to downward and upward motion of the sampling heads, the relay 91 is accordingly energized when said micro-switch is in the closed-circuit position. The changeover contacts of said relay are reversed, thereby connecting the second phase of the electrovalve 78 as well as the second phase of the electrovalve 79. However, the electrovalve 78 operates alone since the first phase of the electrovalve 79 is not connected. In fact, in order that this latter should be connected, it would be necessary to ensure that the micro-switch 68 is in the closed-circuit position, which is not the case if there is no test-tube opposite to the feeler which controls the micro-switch 68. If consideration is given to the micro-switch 73 which corresponds to forward and backward motion of the sampling heads, the operation is exactly as described in the foregoing and the electrovalve 80 accordingly operates alone.

If the feelers 35 detect a test-tube in both analysis lines, the operation takes place exactly in the manner which has already been explained above apart from the fact that the electrovalves 79 and 81 will operate since the micro-switches 67 and 68 are in the closed-circuit position.

A set of cams which is not shown and is controlled by the aforesaid programmer is provided in the analyzer in order to select the signals emitted by the detection devices 13 and thus to permit printing of the results of analysis.

I claim:

1. An automatic sample analyzer comprising: means for displacing successive series of test-tubes along $n+1$ parallel paths in which $n$ is a predetermined integer representing the maximum number of analyses to be performed on a single sample, one test-tube of each series being intended to contain one sample to be analyzed and the other test-tubes being intended to receive a predetermined dose of said sample and reagent means corresponding to the analyses to be performed; means for taking sample doses from the sample test-tube of each series and transferring said doses into analytical test-tubes of the same series; means for injecting into each reaction test-tube a predetermined dose of at least one reagent; means for taking from each analytical test-tube a dose of its contents and performing an analysis of said last-named dose, all said means being controlled by a pre-established program, one path being reserved for the sample test-tubes and said displacing means being so arranged as to displace simultaneously each sample test-tube and the analytical test-tubes of the same series and at most equal in number to $n$, wherein the improvement consists in that means are provided for detecting the presence or absence of an analytical test-tube on each of the paths followed by said test-tubes and for automatically preventing at least one of the operations consisting of injection of reagent to the paths on which no analytical test-tubes are present and of transfer of sample doses to said paths on which no analytical test-tubes are present.

2. An analyzer in accordance with claim 1, having means for detecting the presence of a test-tube on each of the paths followed by the analytical test-tubes and means to allow said sampling operation only from the test-tubes which are present.

3. An analyzer in accordance with claim 1, wherein said detection means are placed at the point at which the corresponding operation is carried out.

4. An analyzer in accordance with claim 1, wherein the means for taking sample doses from the sample test-tube and for transferring said doses into the analytical test-tubes comprise at least two parallel movable arms each carrying a sampling head, said arms having a longitudinal axis which is parallel to a direction along which the sample test-tube and the analytical test-tubes of the same series are alined and being arranged for displacement along said axis and along a direction at right angles to said axis, said two arms being offset with respect to each other in a direction parallel to the paths followed by the test-tubes, one sampling head being intended to take sample doses without reagent whilst the other sampling head is intended to take sample doses intended to be used with reagent.

5. An analyzer in accordance with claim 4, wherein the sampling means comprise a first proportioning pump and a second proportioning pump for distributing reagent which injects a dose of reagent into the first proportioning pump at the time of discharge of the sample which has been drawn up by the first pump and said dose fills the available space within said first pump, the control of said first pump being intended to produce partial suction of the reagent contained therein prior to taking a fresh sample to be analyzed and an air bubble consequently sucked into the pump so as to form a plug between said reagent and the fresh sample to be taken.

6. An analyzer in accordance with claim 5, wherein the means for injecting a dose of reagent into the analytical test-tubes are constituted by $n$ injection heads each located directly above one of the paths followed by the analytical test-tubes, said heads being movable and independent from each other.

7. An analyzer in accordance with claim 1, wherein said means for taking from each analytical test-tube a dose of the contents thereof are constituted by a sampling head comprising $n$ sampling needles, each needle being located directly above one of the paths followed by the analytical test-tubes, the needles being disposed in rows in a direction parallel to the direction in which the sample test-tube and the corresponding analytical test-tubes are disposed, said sampling head being attached to an element which is so arranged as to be capable of displacement in a direction at right angles to the direction of displacement of the test-tubes in order to carry out the sampling operation.

8. An analyzer in accordance with claim 1, wherein the means provided at the point of injection of reagents into the analytical test-tubes in order to detect the presence of a test-tube on each of the paths followed by said test-tubes are constituted by feelers corresponding in number to the reagents to be injected into the analytical test-tubes, said feelers being so arranged as to be influenced by the test-tubes without interfering with the displacement of said test-tubes.

9. An analyzer in accordance with claim 8, wherein each feeler aforesaid is provided with means for guiding the corresponding analytical test-tube at the point of injection of reagent so that the longitudinal axis of said test-tube should coincide substantially with the axis of the injection-head element which distributes the reagent.

10. An analyzer in accordance with claim 1, wherein the means provided at the point at which sample doses are taken from the sample test-tube and transferred into the analytical test-tubes in order to detect the presence of a test-tube on each of the paths followed by said analytical test-tubes are constituted by $n$ feelers, each feeler being intended to cooperate with an analytical test-tube and being displaceable by the corresponding test-tube which moves on its path aforesaid in order to close a switch so that a sample dose taken from the sample test-tube may then be transferred into the analytical test-tube which has been detected by the feeler.

11. An analyzer in accordance with claim 1, wherein the means provided at the point at which a sample is taken from the analytical test-tubes in order to detect the presence of a test-tube on each of the paths followed by the analytical test-tubes are constituted by $n$ feelers which are intended to be actuated by the detected test-tube in order to close a switch and to permit sampling of the contents of the test-tube for the purpose of analysis.

12. An analyzer in accordance with claim 1, wherein said analyzer comprises means for the step-by-step displacement along the paths aforesaid of a support on which each series of test-tubes is aligned.

13. An analyzer in accordance with claim 1, wherein the means for taking sample doses, the means for injecting reagents and the sampling means for detecting the result of analyses are controlled by a cam-type programmer which supplies all the possible orders and by an additional electric control which is determined by the position of the feelers aforesaid and is capable of inhibiting the orders derived from the programmer.

14. An analyzer in accordance with claim 1,
wherein said analyzer comprises an incubation zone for maintaining a predetermined temperature, said zone being formed between the sample-taking operation and the final sampling operation and means for adjusting the incubation zone independently in respect of each path.

15. An analyzer in accordance with claim 14, wherein means are provided for establishing two different conveying levels along the length of the paths followed by the analytical test-tubes within the incubation zone and comprising one level at which the test-tubes pass within channels at constant temperature whilst the other level is at ambient temperature externally of said channels.

16. A method of automatic analysis of samples, wherein:

successive series of test-tubes are displaced in step-by-step motion, one test-tube of each series containing one sample being placed on one path and the other test-tubes which are intended to receive analysis reagents being placed over all or part of $n$ paths which are parallel to the first;

the operations initiated at successive points of the test-tube path consist in taking sample doses from the sample test-tube and transferring said doses into the analytical test-tubes of the same series, injecting into each analytical test-tube a predetermined dose of reagent and taking a dose from each analytical test-tube;

the presence or absence of analytical test-tubes is detected on each of the paths followed by said test-tubes;

at least one of the orders for sampling and injecting reagent is inhibited automatically in response to the absence of the corresponding analytical test-tube.

References Cited
UNITED STATES PATENTS

| | | | |
|---|---|---|---|
| 3,597,161 | 8/1971 | Greiner | 23—253 |
| 3,615,239 | 10/1971 | Jones | 23—259 |
| 3,622,279 | 11/1971 | Moran | 23—259 |

MORRIS O. WOLK, Primary Examiner

R. E. SERWIN, Assistant Examiner

U.S. Cl. X.R.

23—253 R, 259; 73—425.6; 141—130